UNITED STATES PATENT OFFICE.

HENRY HIGHTON, OF PUTNEY, ENGLAND.

IMPROVEMENT IN GALVANIC-BATTERIES.

Specification forming part of Letters Patent No. 131,878, dated October 1, 1872.

*To all whom it may concern:*

Be it known that I, HENRY HIGHTON, M. A., of Putney, in the county of Surrey, England, a subject of the Queen of Great Britain, have invented or discovered new and useful Improvements in Galvanic-Batteries; and I, the said HENRY HIGHTON, do hereby declare the nature of the said invention, and in what manner the same is to be performed, to be particularly described and ascertained in and by the following statement thereof—that is to say:

These improvements have four objects; first, to provide cheaper or more convenient materials for oxidation or similar chemical change on one side of the battery, which I will call the positive side; secondly, cheaper or more convenient materials on the other side of the battery to supply the oxygen, or otherwise conduce to such aforesaid change; thirdly, to prevent injurious local action in the battery.

First, with a view to the first object, I place sulphur with the positive electrode, which not only may combine with it, but may be itself oxidized; or I use a liquid which readily admits of a higher state of oxidation—such as sulphurous, hyposulphurous, ferrous, manganous, cupreous, chromous, or similar compounds—to assist the action; or I use, with or without the sulphur, some carbonaceous or other organic compound, as sugar, sawdust, decaying wood, and especially those containing protein, which, by admitting of ready oxidation, or similar chemical change, either by the direct action of the oxidizing materials of the other side of the battery, or by reducing the oxides or similar compounds formed or existing on the positive side, may contribute to the general chemical action of the battery; or I use these different means, as aforesaid, in combination with each other. For the purpose of consuming sulphur in the positive part of the cell I prefer to use an electrode of iron, which gradually combines on the surface with flowers or milk of sulphur placed with it in the cell. The liquid in the battery may be a solution of common salt, nitrate of soda, or chloride of ammonium; or other exciting fluids may be employed; and the negative electrode may be carbon in a porous cell, with nitrate of soda, sulphuric acid, and water, in the proportion of from five to ten parts of sulphuric acid to one part of nitrate of soda, dissolved in three or more parts of water; or I dissolve the sulphur in an alkaline solution, and employ such solution as the exciting liquid in the battery in place of or in addition to the solution of common salt or nitrate of soda or chloride of ammonium above mentioned, in which case a positive electrode of carbon may be advantageously used; or I combine the sulphur with an alkali to form a soluble sulphide. A soluble sulphide of sodium, potassium, or calcium, or a mixture of a more readily soluble sulphide with a sulphide of calcium will answer as the exciting liquid, around the positive electrode. Again, a good current may be obtained by using a carbon electrode as a positive in a solution of a substance admitting of a higher state of oxidation. Hyposulphurous, sulphurous, ferrous, manganous, cupreous, chromous salts or compounds will answer the purpose, or the soluble cyanides, although these are more expensive. When these compounds are used the negative electrode must be such as will readily supply them with oxygen. The manganous salts, when raised by the action of the battery to a higher state of oxidation, may be reduced again by simply heating with an excess of sulphuric or muriatic acid, the action being assisted, if desirable, by the addition of some suitable organic substance. The salts of copper may, in like manner, be reduced by an organic substance in an alkaline solution and the salts of iron by placing on them scraps of iron or sulphide of iron in a finely divided state. If in the negative part of the battery a powerful oxidizing substance be used as hereinafter described, a solution—which is best alkaline—containing meal, sugar, or other readily oxidizing substance, with a positive electrode of carbon, will afford a galvanic current directly. The action of the battery, in all these cases, is rendered more efficient and energetic by heating the exciting liquid.

Second. For the second of the purposes set forth in the introductory paragraph of this specification I use salts of iron in conjunction with nitric acid or such other salts as will absorb and utilize the nitric oxide formed by the working of the battery—salts of chromium, manganese, and copper will answer the purpose. The most convenient substance to use is protosulphate of iron, which should be put with the nitric acid into the battery-cell. When, by the action of the battery, the liquid is spent it may be restored to a full oxidation at any time by being heated, with free exposure to the air, or in a vessel partly filled with the liquid, and filled up with cinders, pumice stone, or similar substance, so as to force any nitric-oxide fumes formed into close contact with damp air, and thus bring them back to the state of nitric acid. When a very high potential is required I use a bichromate of soda, lime, or baryta, dissolved with dilute sulphuric or other suitable acid, which I prefer to be in excess, or what is more powerful still, a permanganate dissolved in dilute sulphuric or other suitable acid, or a chlorate with sulphuric, hydrochloric, or other suitable acid, by affording a free supply of oxygen; or chlorine will furnish a very powerful negative. In the negative part of the battery I place a body of coarsely-broken cinders, charcoal, spongy platinum, or other similar material, in close connection with the negative electrode and placed partly in the liquid and partly rising out of it, so as to form a damp porous bed, pervious to the atmosphere in which the substances deoxidized by the action of the battery may rise and recover their oxygen by the means of coming into contact with the atmosphere in the pores and at the surface of such materials. The cinders or similar materials are best platinized or imbued with platinum-black, in order to assist the action. The cinders may be either placed in a bag with the negative electrode and tied tightly round so as to press on it, or may be pressed with it tightly into a porous cell. For the negative electrode of a battery I prefer to use a rod or plate of carbon or platinum with cinders, or a similar substance, tightly packed round it, so as to be in electrical communication with it, and standing partly in the liquid and partly in the air, so as to form a damp porous bed readily permeable to the atmosphere through which the gas evolved at the surface of the electrode has to pass, and then it recovers the oxygen which it has lost. The cinders act more powerfully when platinized by voltaic deposition or otherwise, or when covered with platinum-black. I find the readiest manner of doing this is to dip them in a solution of soap, and then sift over them some platinum-black, which is attached to their surface by the slightly glutinous character of the solution of soap. Where a large current of electricity is required, and where porous jars are used to contain the cinders, it is advisable to have a few holes pierced in the porous jar containing the cinders, just above the level of the liquid, in order to secure a free access and draft of atmospheric air. I prefer that the cinders should be broken about the size of hazel-nuts. I am aware that a porous jar containing coarsely-broken carbon, packed round the carbon plate, has been before used mixed with peroxide of manganese; therefore, I only claim the use of small cinders or other substances, as described, when left with free access of air unimpeded by peroxide of manganese or other substance which may choke and hinder the free access of atmospheric air, the essential point of my invention being the use of atmospheric air as a costless source of oxygen.

Third. With the third object set forth in the introductory paragraph of my specification, I place with the zinc or other positive electrode, when the liquid used admits of the admixture, another liquid which will precipitate the injurious soluble salts formed, as the salts of zinc or copper, which cause local action. Carbonate, or better still, silicates of the alkali metals, will answer this purpose. Thus, in the Daniell battery I place, in the positive part of the battery, to prevent the deposition of copper on the zinc, a solution of soluble silicate or an alkaline carbonate; or even carbonate of lime, or baryta, will answer this purpose.

I claim as my invention—

1. The use as positives of sulphur, the soluble sulphides, soluble salts, or compounds admitting of a higher state of oxidation, in the manner above described.

2. In the negative side of the battery, the use of a tower of cinders, or similar substances, freely permeable by the atmosphere, as above described.

3. The use with nitric acid of protosulphate of iron, to absorb nitric oxide, as described.

4. The use of a substance in the positive part of the battery which will precipitate injurious soluble metallic salts, as described.

HENRY HIGHTON.

Witnesses:
  G. J. WARREN,
  THOS. BROWN,
*Both of No. 17, Gracechurch street, London.*